US012413910B2

(12) United States Patent
Ren et al.

(10) Patent No.: US 12,413,910 B2
(45) Date of Patent: Sep. 9, 2025

(54) SPEAKER DEVICE

(71) Applicant: AAC Microtech (Changzhou) Co., Ltd., Jiangsu (CN)

(72) Inventors: Zhang Ren, Changzhou (CN); Zhiwei Zhong, Changzhou (CN); Qiaoling Li, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 173 days.

(21) Appl. No.: 18/533,247

(22) Filed: Dec. 8, 2023

(65) Prior Publication Data

US 2025/0133350 A1 Apr. 24, 2025

Related U.S. Application Data

(63) Continuation of application No. PCT/CN2023/125905, filed on Oct. 23, 2023.

(51) Int. Cl.
*H04R 9/06* (2006.01)

(52) U.S. Cl.
CPC .................................... *H04R 9/06* (2013.01)

(58) Field of Classification Search
CPC ........ H04R 1/2834; H04R 9/025; H04R 1/22; H04R 1/26; H04R 1/023; H04R 1/2826; H04R 1/025; H04R 9/06; H04R 9/02; H04R 1/2857; H04R 7/127; H04R 1/24; H04R 2400/01; H04R 2400/11; H04R 7/16; H04R 9/046; H04R 7/04; H04R 9/063
USPC .................................................. 381/400–412
See application file for complete search history.

(56) References Cited

U.S. PATENT DOCUMENTS 8,300,876 B2 * 10/2012 Xu ....................... H04R 31/006 381/431
2004/0071303 A1 * 4/2004 Furuya .................. H04M 1/035 379/433.02
2005/0254680 A1 * 11/2005 Kitamura ................. H04R 1/06 381/396
2020/0213741 A1 * 7/2020 Shen ...................... H04R 1/345
2020/0213761 A1 * 7/2020 Xiao ........................ H04R 7/04
2023/0292037 A1 * 9/2023 Xu ........................... H04R 1/24

FOREIGN PATENT DOCUMENTS

CN 201781608 U * 3/2011

* cited by examiner

*Primary Examiner* — Carolyn R Edwards
*Assistant Examiner* — Julie X Dang
(74) *Attorney, Agent, or Firm* — Wiersch Law Group

(57) ABSTRACT

The present application provides a speaker device including a casing and a sounding driver. The casing has an accommodating space and a sound-conducting channel, and the sounding driver is accommodated in the accommodating space. The sounding driver comprises a first frame, a first vibration system, a magnetic circuit system, a second frame, a second vibration system, and a conductive insert. An end of the second frame separates the front sound cavity into a first front sound cavity and a second front sound cavity. The sound-conducting channel is connected to the first front sound cavity; the second frame is provided with a first notch and a second notch. The first and the second notches are connected the second front sound cavity to the first front sound cavity. Compared with the related art, the speaker device of the present application has better acoustic performance and drainage performance.

9 Claims, 5 Drawing Sheets

B-B

SPEAKER DEVICE

CROSS-REFERENCE TO RELATED APPLICATIONS

This application is a continuation of International Application No. PCT/CN2023/125905, filed Oct. 23, 2023, the entire contents of which are incorporated herein by reference.

TECHNICAL FIELD

The present application relates to the field of electroacoustic conversion, in particular to a speaker device.

BACKGROUND

The speaker device is a transducer that converts electrical signals into sound signals. It is primarily categorized into two modes: the single vibration system and the dual vibration system. In the dual vibration system mode, the speaker device includes a first vibration system fixed to a frame for producing low-frequency sounds and a second vibration system fixed to the magnetic circuit for producing high-frequency sounds.

In the speaker device with the dual vibration system mode in the related art, the first vibration system and the second vibration system produce sounds through sound-conducting channels formed by the closed structure, which are isolated from each other, and the first vibration system, which produces the high-frequency sounds tends to use the smaller sound-conducting channel. On the other hand, the closed structure also makes the drainage performance of the speaker device decrease, so that the high-frequency sound band produced by the speaker device in the related art is too narrow, and the drainage performance is insufficient, which results in the acoustic performance of the speaker device in the water-entry environment being reduced.

Therefore, it is necessary to provide a new speaker device to solve the above technical problem.

SUMMARY

An object of the present application is to provide a speaker device with better acoustic performance in dual vibration system mode.

In order to achieve the above object, the present application provides a speaker device, comprising:

a casing having an accommodating space and formed by a top cover, an upper cover and a bottom cover;

a sound-conducting channel formed in the casing; and a sounding driver accommodated in the accommodating space; wherein the sounding driver is fixed to the casing and separates the accommodating space into a front sound cavity and a rear cavity; the sound-conducting channel connects the front sound cavity to the outside world, and the sound-conducting channel and the front sound cavity together form a front cavity; the sounding driver comprises:

a first frame, fixedly supported on the casing;

a first vibration system, comprising a first diaphragm fixed at its outer periphery to the first frame and a first voice coil configured to drive the first diaphragm to vibrate to produce sounds;

a magnetic circuit system, fixed to the first frame, wherein a side of the magnetic circuit system close to the first vibration system is provided with a first magnetic gap and a second magnetic gap; the first magnetic gap is arranged around the second magnetic gap and spaced apart from each other; and the first voice coil is inserted and suspended within the first magnetic gap;

a second frame, fixed to a top of the magnetic circuit system;

a second vibration system, comprising a second diaphragm fixed at its outer periphery to a side of the second frame away from the magnetic circuit system, and a second voice coil configured to drive the first diaphragm to vibrate to produce sounds; wherein the second voice coil is inserted and suspended within the second magnetic gap; and a conductive insert, extended from a bottom of the magnetic circuit system to the top of the magnetic circuit system and extended below the second diaphragm, and electrically connected to the second voice coil; wherein one end of the second frame away from the magnetic circuit system is abutted against the casing and separates the front sound cavity into a first front sound cavity and a second front sound cavity, wherein the upper cover of the casing, a side wall of the bottom cover, and the sounding driver together enclose the first front sound cavity; the upper cover of the casing and the sounding driver together enclose the second front sound cavity; the sound-conducting channel is in communication with the first front sound cavity; the second frame is provided with a first notch and a second notch, wherein the first notch and the second notch are arranged through the second frame in a direction perpendicular to a vibration direction of the second diaphragm; the first notch is spaced opposite the second notch and the first notch is smaller than the second notch; the first notch and the second notch both connect the second front sound cavity to the first front sound cavity.

In one embodiment, the first notch is located on a side of the second frame close to the sound-conducting channel, and the second notch is located on a side of the second frame away from the sound-conducting channel.

In one embodiment, the first notch and the second notch are both formed by a downward depression of one end of the second frame away from the magnetic circuit system; a depth of the first notch is less than a depth of the second notch, and a width of the first notch is less than a width of the second notch.

In one embodiment, an end of the conductive insert away from the second diaphragm is arranged through the casing and at least partially exposed outside the casing.

In one embodiment, the magnetic circuit system comprises an upper splint in the shape of an annulus, a lower splint, a main magnetic steel, a first sub-magnetic steel, a pole core, and a second sub-magnetic steel; wherein the upper splint is fixedly stacked on the first sub-magnetic steel and fixedly connected to the first frame; the main magnetic steel is in the shape of an annulus and fixedly stacked on the lower splint; the first sub-magnetic steel is fixedly stacked on the lower splint and arranged around the main magnetic steel, and the main magnetic steel and the first sub-magnetic steel are spaced apart to form the first magnetic gap;

the pole core comprises a core body in the shape of an annulus and fixedly fixed to the main magnetic steel and a core extension in the shape of an annulus and bent and extended from an inner periphery of the core body along a direction away from the lower splint, wherein the core extension is arranged around the conductive insert;

the second sub-magnetic steel is fixedly stacked on a side of the core body close to the first vibration system, the second sub-magnetic steel is arranged around the core extension and spaced apart from the core extension to form the second magnetic gap In one embodiment, the magnetic circuit system further comprises a secondary pole core fixedly stacked on a side of the second sub-magnetic steel close to the first vibration system, wherein the secondary pole core is in the shape of an annulus and arranged around the conductive insert, and the second frame is connected to an outer periphery of the secondary pole core.

In one embodiment, the first vibration system further comprises a first skeleton, comprising a skeleton body in the shape of an annulus and used as the first vibration portion and a skeleton fixing portion bent downwardly and extended from an outer periphery of the skeleton body.

In one embodiment, the first diaphragm comprises a first folded ring in the shape of an annulus, a second folded ring in the shape of an annulus, which is spaced apart from the first folder ring and arranged on an inner side of the first folded ring, and a first vibration portion in the shape of an annulus, which is bent and extended from an inner periphery of the first folded ring to be connected to the outer periphery of the second folded ring; an outer periphery of the first folded ring is fixed to the first skeleton; an inner periphery of the second folded ring being fixed to the second skeleton body; an inner periphery of the second folded ring is fixed to a side of the first sub-magnetic steel away from the main magnetic steel; and the first voice coil is fixed to a side of the first vibration portion close to the magnetic circuit system.

In one embodiment, the inner periphery of the second folded ring is fixedly sandwiched between the second frame and the main magnetic steel.

In one embodiment, the second diaphragm comprises a second vibration portion, a third folded ring in the shape of an annulus and extended outwardly from an outer periphery of the second vibration portion, and a second dome covered on the second vibration portion, wherein an outer periphery of the third folded ring is fixed to a side of the second frame away from the first sub-magnetic steel, and the second voice coil is fixed to the second vibration portion.

Compared with the prior art, the speaker device of the present application includes a casing having an accommodating space and formed by a top cover, an upper cover and a bottom cover; a sound-conducting channel formed in the casing, and a sounding driver accommodated in the accommodating space. The sounding driver is fixed to the casing and separates the accommodating space into a front sound cavity and a rear cavity. The sound-conducting channel connects the front sound cavity to the outside world, and the sound-conducting channel and the front sound cavity together form a front cavity. The sounding driver includes: a first frame, fixedly supported on the casing; a first vibration system, including a first diaphragm fixed at its outer periphery to the first frame and a first voice coil configured to drive the first diaphragm to vibrate to produce sounds; a magnetic circuit system, fixed to the first frame, in which a side of the magnetic circuit system close to the first vibration system is provided with a first magnetic gap and a second magnetic gap; the first magnetic gap is arranged around the second magnetic gap and spaced apart from each other; and the first voice coil is inserted and suspended within the first magnetic gap; a second frame, fixed to a top of the magnetic circuit system; a second vibration system, including a second diaphragm fixed at its outer periphery to a side of the second frame away from the magnetic circuit system, and a second voice coil configured to drive the first diaphragm to vibrate to produce sounds, in which the second voice coil is inserted and suspended within the second magnetic gap; and a conductive insert, extended from a bottom of the magnetic circuit system to the top of the magnetic circuit system and extended below the second diaphragm, and electrically connected to the second voice coil. One end of the second frame away from the magnetic circuit system is abutted against the casing and separates the front sound cavity into a first front sound cavity and a second front sound cavity. The upper cover of the casing, a side wall of the bottom cover, and the sounding driver together enclose the first front sound cavity. The upper cover of the casing and the sounding driver together enclose the second front sound cavity. The sound-conducting channel is in communication with the first front sound cavity. The second frame is provided with a first notch and a second notch, in which the first notch and the second notch are arranged through the second frame in a direction perpendicular to a vibration direction of the second diaphragm. The first notch is spaced opposite the second notch and the first notch is smaller than the second notch. The first notch and the second notch both connect the second front sound cavity to the first front sound cavity. The speaker device is provided with the second frame having two side notches in the treble vibration system, wherein the larger second notch is connected to the front sound cavity, so that the treble airflow comes out from the direction of being backed up against the sound-conducting channel and then converges with the front cavity, so as to lengthen the conduction channel of the treble airflow, thereby raising the treble frequency band of the speaker device, and improving the high-frequency sounds. The smaller first notch is provided squarely opposite to the sound-conducting channel, so that the speaker device can improve the drainage efficiency through the first notch, thereby improving the acoustic performance and usability of the speaker device in the water ingress environment.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Figure 1:
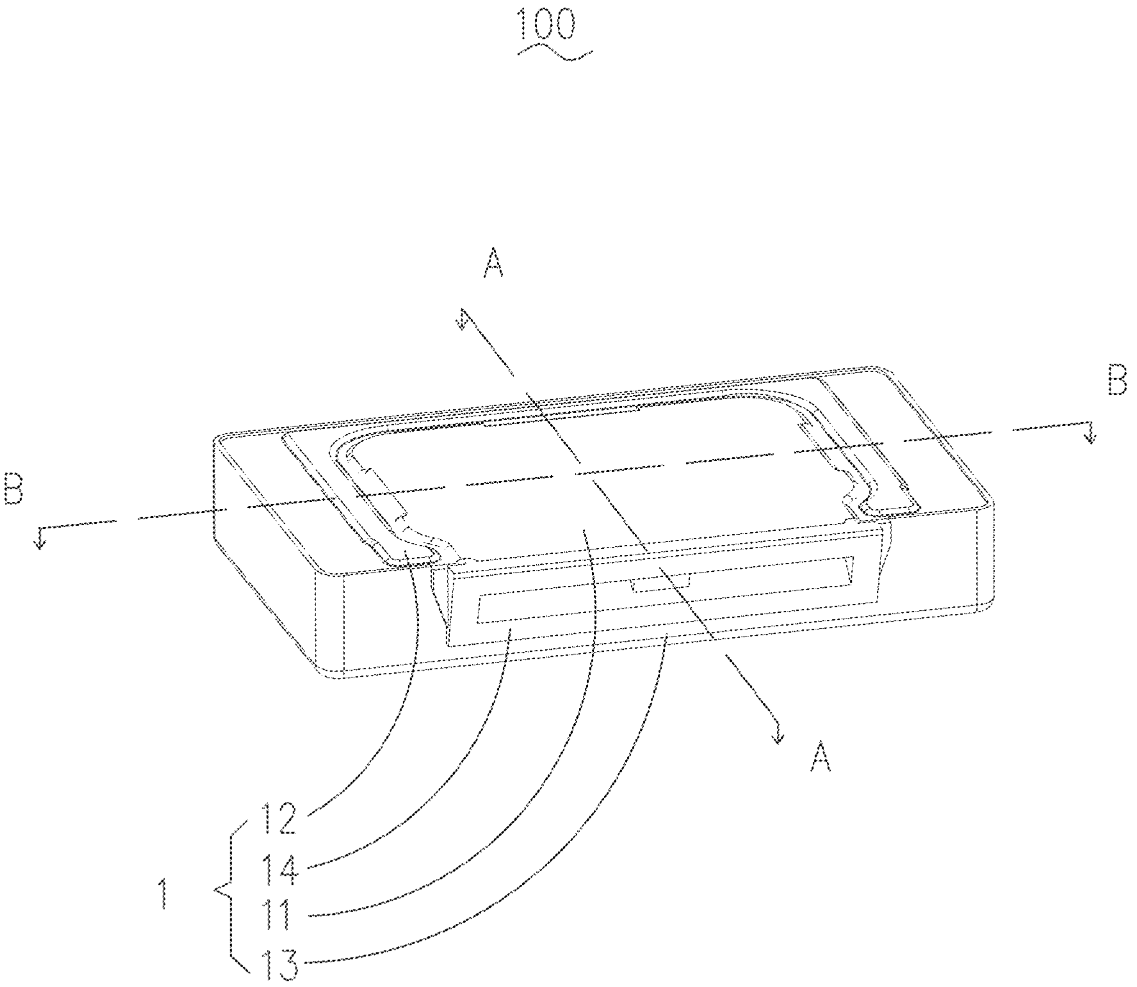
FIG. 1 shows a three-dimensional structural diagram of a speaker device of an embodiment of the present application.
Figure 2:
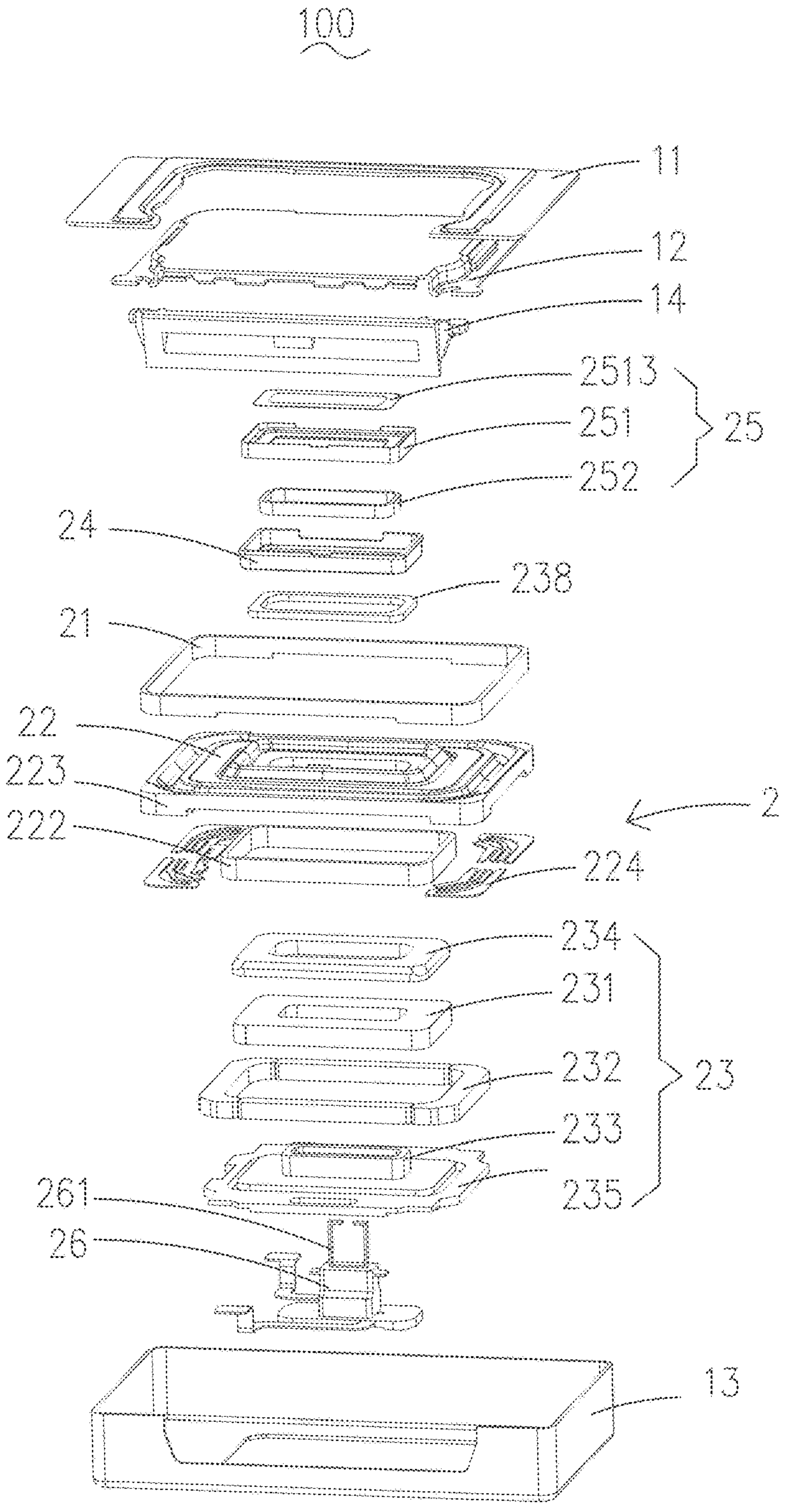
FIG. 2 shows a three-dimensional exploded view of the speaker device according to an embodiment of the present application.
Figure 3:
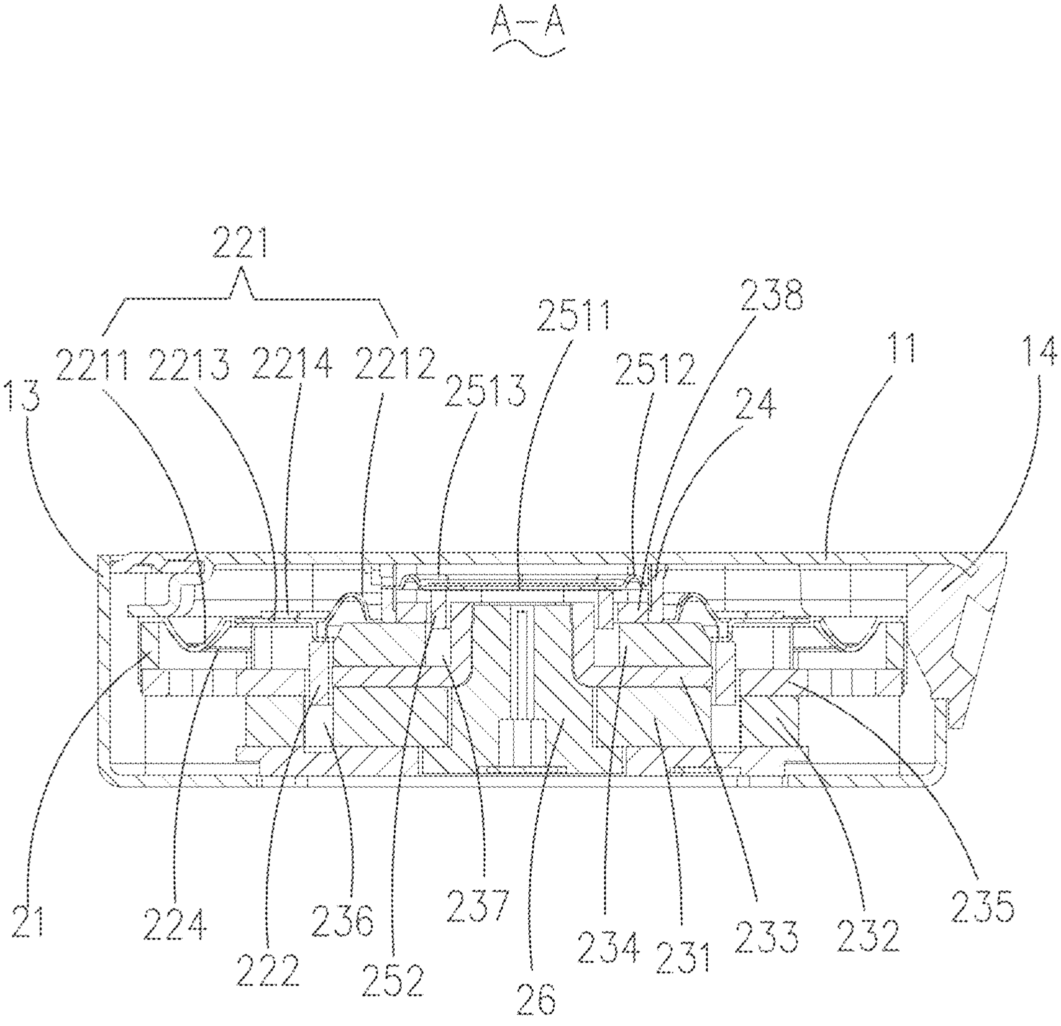
FIG. 3 shows a sectional view of line A-A in FIG. 1.
Figure 4:
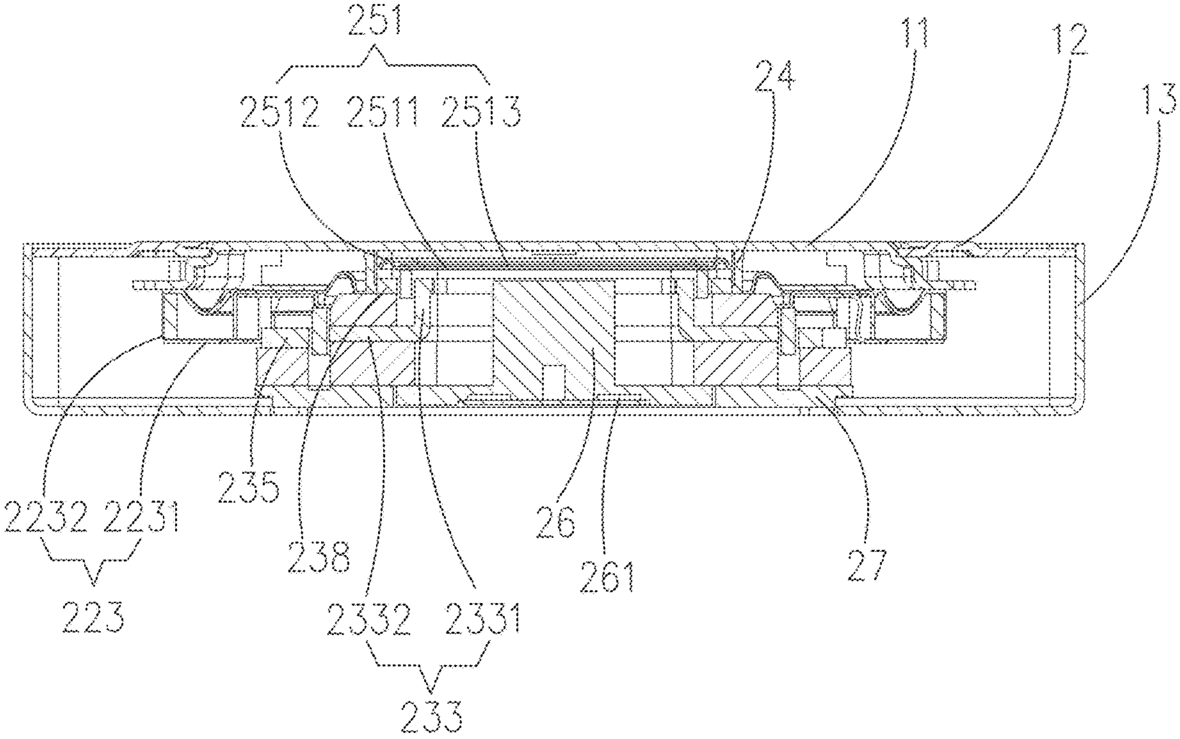
FIG. 4 shows a sectional view of line B-B in FIG. 1.
Figure 5:
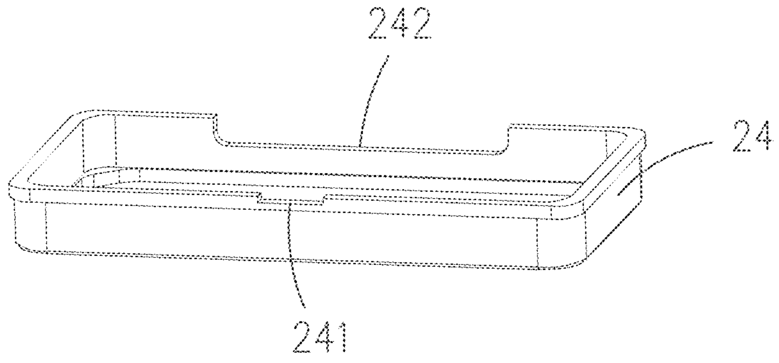
FIG. 5 shows a structural diagram of a second frame in the speaker device according to an embodiment of the present application.

As shown in FIGS. 1-5, embodiments of the present application provide a speaker device 100, including a casing 1 and a sounding driver 2.

The casing 1 has an accommodating space, and a sound-conducting channel 14 formed within the casing. In this embodiment, in order to facilitate the assembly of the speaker device 100, the casing 1 specifically includes a top cover 11, a upper cover 12, the sound-conducting channel 14, and a bottom cover 13.

The sounding driver 2 is accommodated in the accommodating space. The sounding driver 2 is fixed to the casing 1 and separates the accommodating space into a front sound cavity and a rear cavity. The sound-conducting channel 14 connects the front sound cavity to the outside world, and the sound-conducting channel 14 and the front sound cavity together form a front cavity. The sounding driver 2 is fixed to the casing 1, and the sounding driver 2 and the bottom cover 13 together form the rear cavity. The sounding driver 2 includes a first frame 21, a first vibration system 22, a magnetic circuit system 23, a second frame 24, a second vibration system 25, and a conductive insert 26.

The first frame 21 is fixedly supported on the casing 1 and is configured to support the first vibration system 22 and the magnetic circuit system 23. In this embodiment, the first frame 21 is a ring-like structure surrounded by metal sheets.

The first vibration system 22 includes a first diaphragm 221 fixed at its outer periphery to the first frame 21 and a first voice coil 222 configured to drive the first diaphragm 221 to vibrate to produce sounds. In this embodiment, the first vibration system 22 is configured to produce low-frequency sounds.

The magnetic circuit system 23 is fixed to the first frame 21, and a side of the magnetic circuit system 23 close to the first vibration system 22 is provided with a first magnetic gap 236 and a second magnetic gap 237. The first magnetic gap 236 is arranged around the second magnetic gap 237 and spaced apart from the second magnetic gap 237. The first voice coil 222 is inserted and suspended within the first magnetic gap 236.

The second frame 24 is fixed to the top of the magnetic circuit system 23 for supporting the second vibration system 25.

The second vibration system 25 includes a second diaphragm 251 fixed at its outer periphery to a side of the second frame 24 away from the magnetic circuit system 23, and a second voice coil 252 configured to drive the second diaphragm 251 to vibrate to produce sounds. The second voice coil 252 is inserted and suspended within the second magnetic gap 237. In this embodiment, the second vibration system 25 is configured to produce high-frequency sounds.

That is, the first vibration system 22 and the second vibration system 25 share the magnetic circuit system 23, and are driven by the magnetic circuit system 23 to produce sounds of different frequency bands, respectively.

The conductive insert 26 is provided with a conductive terminal 261 throughout, and the conductive insert 26 is extended from the bottom of the magnetic circuit system 23 to the top of the magnetic circuit system 23 and extended to the second diaphragm 251, and electrically connected to the second voice coil 252 through the conductive terminal 261. The electrical signal of the first voice coil 222 is electrically powered through a conductive member 224 fixed to the first frame 21.

Specifically, in this embodiment, one end of the second frame 24 away from the magnetic circuit system 23 is abutted against the casing 1 and separates the front sound cavity into a first front sound cavity and a second front sound cavity. The upper cover 12, a side wall of the bottom cover 13 of the casing 1 and the sounding driver 2 together enclose the first front sound cavity, and the top cover 11 of the casing 1 and the sounding driver 2 together enclose the second front sound cavity. The sound-conducting channel 14 is in communication with the first front sound cavity. The second frame 24 is provided with a first notch 241 and a second notch 242, in which the first notch 241 and the second notch 242 are arranged through the second frame 24 in a direction perpendicular to the vibration direction of the second diaphragm 251. The first notch 241 is spaced opposite the second notch 242. A size of the first notch 241 is smaller than a size of the second notch 242. Both the first notch 241 and the second notch 242 connect the second front sound cavity to the first front sound cavity.

Specifically, in this embodiment, in the case where the second voice coil 252 drives the second diaphragm 251 to vibrate to produce high-frequency sounds, the high-frequency airflow generated by the second front sound cavity is conducted into the first front sound cavity through the first notch 241, the second notch 242 and thus emits the high-frequency sounds through the sound-conducting channel 14. In order to realize such a design, when a notch is provided on the second frame 24, the circumference of the second diaphragm 251 (the fixing portion of the second diaphragm 24) needs to be adaptively shaped as a notch, so as to realize a fixed fit of the circumference of the second diaphragm 251 to the second frame 24.

Specifically, in this embodiment, the first notch 241 is located on a side of the second frame 24 close to the sound-conducting channel 14, and the second notch 242 is located on a side of the second frame 24 away from the sound-conducting channel 14. The first notch 241 and the second notch 242 are provided at different positions to produce different effects. The first notch 241 is arranged through a side of the second frame 24 close to the sound-conducting channel 14, enabling the treble airflow to be transmitted through the first notch 241 to the sound-conducting channel 14 without being conducted through the first front sound cavity. In the event of water ingress into the second front sound cavity, such a design allows water vapor to be carried out of the second front sound cavity by the action of the treble airflow and discharged through the sound-conducting channel 14, so as to improve the water drainage performance of the speaker device 100 and to optimize the acoustic effect in the water ingress environment. the second notch 242 is arranged through a side of the second frame 24 away from the sound-conducting channel 14, and the first front sound cavity is in communication with the second front sound cavity, so that the treble airflow can be conducted to the first front sound cavity through the second notch 242. Since the space of the first front sound cavity is much larger than the space of the second front sound cavity, the frequency band of the treble airflow is extended, and the high-frequency effect of the speaker device 100 can be improved when the sound airflow is ultimately transmitted out to the sound-conducting channel 14.

Specifically, in this embodiment, the first notch 241 and the second notch 242 are both formed by a downward depression of one end of the second frame 24 away from the magnetic circuit system 23. The depth of the first notch 241 is less than the depth of the second notch 241, and the width of the first notch 241 is less than the width of the second notch 242. By such design, the size of the opening of the first notch 241 is smaller than the second notch 242. In this embodiment, the first notch 241 and the second notch 242 are provided at different positions to produce different effects, in which the first notch 241 is configured to assist in draining water and the second notch 242 is configured to widen the treble band of the front sound cavity, in order to ensure that the opening of the first notch 241 does not excessively affect the acoustic performance of the speaker device. In this embodiment, the opening of the first notch 241 is arranged to be smaller than the second notch 242, so that the treble airflow can be conducted to the front sound cavity more through the second notch 242 with a larger opening, while the first notch 241 having a smaller opening can satisfy the water draining performance requirements of the speaker device 100 without excessively leaking the high-frequency airflow.

Specifically, in this embodiment, the magnetic circuit system 23 is arranged around the conductive insert 26. One end of the conductive insert 26 is connected to the second voice coil 252, and the other end of the conductive insert 26 away from the second diaphragm 24 is arranged through the casing 1 and is at least partially exposed outside the casing 1.

Specifically, in this embodiment, the casing 1 is provided with a through-hole, which is arranged through the casing 1. The sounding driver 2 further includes a lower splint 27 fixed to the casing 1 and arranged around the conductive insert 26. The lower splint 27 is covered on the through-hole and exposed outside the casing 1. This structure is set up in such a way as to allow the magnetic circuit system 23 to make full use of the space in the thickness of the casing 1, while guaranteeing the same volume of the rear chamber, which allows the speaker device to be made thinner;

The magnetic circuit system 23 further includes a main magnetic steel 231, a first sub-magnetic steel 232, a pole core 233, a second sub-magnetic steel 234, and an upper splint 235. The upper splint 235 is fixedly stacked on the first sub-magnetic steel 232 and fixedly connected to the first frame 21. The main magnetic steel 231 is in the shape of an annulus and fixedly stacked on the lower splint 27. The first sub-magnetic steel 232 is fixedly stacked on the lower splint 27 and arranged around the main magnetic steel 231. The main magnetic steel 231 and the second sub-magnetic steel 234 are spaced from the first sub-magnetic steel 232 to form the first magnetic gap 236.

The pole core 233 includes a core body 2331 in the shape of an annulus and fixedly stacked on the main magnetic steel 231 and a core extension 2332 in the shape of an annulus, which is bent and extended in a direction away from the lower splint 27 from an inner periphery of the core body 2331. The core extension 2332 is arranged around the conductive insert 26.

The second sub-magnetic steel 234 is fixedly stacked on the side of the core body 2331 close to the vibration system. The second sub-magnetic steel 234 are arranged around the core extension 2332 and spaced apart from the core extension 2332 to form the second magnetic gap 237.

Specifically, in this embodiment, in order to further improve the magnetic field performance of the magnetic circuit system 23, the magnetic circuit system 23 further includes a secondary pole core 238 fixedly stacked on the side of the second sub-magnetic steel 234 close to the first vibration system 22. The secondary pole core 238 is in the shape of an annulus and arranged around the conductive insert 26, and the second frame 24 is connected to an outer periphery of the secondary pole core 238. This structure effectively reduces the loss of magnetic lines of force from the second sub-magnetic steel 234. The inner periphery of the second frame 24 is fixedly connected to the outer periphery of the secondary pole core 238, thereby improving the structural stability of the second frame 24.

Specifically, in this embodiment, the first vibration system 22 further includes a first skeleton 223. The first skeleton 223 includes a skeleton body 2231 in the shape of an annulus and used as the first vibration portion 2213, and a skeleton fixing portion 2232 bent downwardly and extended from an outer periphery of the skeleton body 2231.

Specifically, in this embodiment, the first diaphragm 221 includes a first folded ring 2211 in the shape of an annulus, a second folded ring 2212 in the shape of an annulus and spaced apart from the first folded ring 2211 and arranged on the inner side of the first folded ring 2211, and a first vibration portion 2213 bent and extent from the inner periphery of the first folded ring 2211 to be connected to the outer periphery of the second folded ring 2212. The outer periphery of the first folded ring 2211 is fixed to the first frame 21, and the inner periphery of the second folded ring 2212 is fixed to the side of the first sub-magnetic steel 232 away from the main magnetic steel 231. The first voice coil 222 is fixed to the side of the first vibration portion 2213 close to the magnetic circuit system 23. The top of the first diaphragm 221 is further provided with an annular first dome 2214. The inner periphery of the second folded ring 2212 is sandwiched between the second frame 24 and the main magnetic steel 231.

Specifically, in this embodiment, the second diaphragm 251 includes a second vibration portion 2511, a third folded ring 2512 in the shape of an annulus and extended outwardly from an outer periphery of the second vibration portion 2511, and a second dome 2513 covered on the second vibration portion 2511. An outer periphery of the third folded ring 2512 is fixed to a side of the second frame 24 away from the first sub-magnetic steel 232, and the second voice coil 252 is fixed to the second vibration portion 2511.

Compared with the prior art, the speaker device of the present application includes a casing having an accommodating space and formed by a top cover, an upper cover and a bottom cover; a sound-conducting channel formed in the casing, and a sounding driver accommodated in the accommodating space. The sounding driver is fixed to the casing and separates the accommodating space into a front sound cavity and a rear cavity. The sound-conducting channel connects the front sound cavity to the outside world, and the sound-conducting channel and the front sound cavity together form a front cavity. The sounding driver includes: a first frame, fixedly supported on the casing; a first vibration system, including a first diaphragm fixed at its outer periphery to the first frame and a first voice coil configured to drive the first diaphragm to vibrate to produce sounds; a magnetic circuit system, fixed to the first frame, in which a side of the magnetic circuit system close to the first vibration system is provided with a first magnetic gap and a second magnetic gap; the first magnetic gap is arranged around the second magnetic gap and spaced apart from each other; and the first voice coil is inserted and suspended within the first magnetic gap; a second frame, fixed to a top of the magnetic circuit system; a second vibration system, including a second diaphragm fixed at its outer periphery to a side of the second frame away from the magnetic circuit system, and a second voice coil configured to drive the first diaphragm to vibrate to produce sounds, in which the second voice coil is inserted and suspended within the second magnetic gap; and a conductive insert, extended from a bottom of the magnetic circuit system to the top of the magnetic circuit system and extended below the second diaphragm, and electrically connected to the second voice coil. One end of the second frame away from the magnetic circuit system is abutted against the casing and separates the front sound cavity into a first front sound cavity and a second front sound cavity. The upper cover of the casing, a side wall of the bottom cover, and the sounding driver together enclose the first front sound cavity. The upper cover of the casing and the sounding driver together enclose the second front sound cavity. The sound-conducting channel is in communication with the first front sound cavity. The second frame is provided with a first notch and a second notch, in which the first notch and the second notch are arranged through the second frame in a direction perpendicular to a vibration direction of the second diaphragm. The first notch is spaced opposite the second notch and the first notch is smaller than the second notch. The first notch and the second notch both connect the second front sound cavity to the first front sound cavity. The speaker device is provided with the second frame having two side notches in the treble vibration system, wherein the larger second notch is connected to the front sound cavity, so that the treble airflow comes out from the direction of being backed up against the sound-conducting channel and then converges with the front cavity, so as to lengthen the conduction channel of the treble airflow, thereby raising the treble frequency band of the speaker device, and improving the high-frequency sounds. The smaller first notch is provided squarely opposite to the sound-conducting channel, so that the speaker device can improve the drainage efficiency through the first notch, thereby improving the acoustic performance and usability of the speaker device in the water ingress environment.

Described above are only some embodiments of the present application, and it should be noted herein that improvements may be made by those of ordinary skill in the art without departing from the inventive conception of the present application, but all of these fall within the protection scope of the present application.

What is claimed is:

1. A speaker device, comprising:

a casing having an accommodating space and formed by a top cover, an upper cover and a bottom cover;

a sound-conducting channel formed in the casing; and a sounding driver accommodated in the accommodating space; wherein the sounding driver is fixed to the casing and separates the accommodating space into a front sound cavity and a rear cavity; the sound-conducting channel connects the front sound cavity to the outside world, and the sound-conducting channel and the front sound cavity together form a front cavity; the sounding driver comprises:

a first frame, fixedly supported on the casing;

a first vibration system, comprising a first diaphragm fixed at its outer periphery to the first frame and a first voice coil configured to drive the first diaphragm to vibrate to produce sounds;

a magnetic circuit system, fixed to the first frame, wherein a side of the magnetic circuit system close to the first vibration system is provided with a first magnetic gap and a second magnetic gap; the first magnetic gap is arranged around the second magnetic gap and spaced apart from each other; and the first voice coil is inserted and suspended within the first magnetic gap;

a second frame, fixed to a top of the magnetic circuit system;

a second vibration system, comprising a second diaphragm fixed at its outer periphery to a side of the second frame away from the magnetic circuit system, and a second voice coil configured to drive the first diaphragm to vibrate to produce sounds; wherein the second voice coil is inserted and suspended within the second magnetic gap; and a conductive insert, extended from a bottom of the magnetic circuit system to the top of the magnetic circuit system and extended below the second diaphragm, and electrically connected to the second voice coil; wherein one end of the second frame away from the magnetic circuit system is abutted against the casing and separates the front sound cavity into a first front sound cavity and a second front sound cavity, wherein the upper cover of the casing, a side wall of the bottom cover, and the sounding driver together enclose the first front sound cavity; the upper cover of the casing and the sounding driver together enclose the second front sound cavity; the sound-conducting channel is in communication with the first front sound cavity; the second frame is provided with a first notch and a second notch, wherein the first notch and the second notch are arranged through the second frame in a direction perpendicular to a vibration direction of the second diaphragm; the first notch is spaced opposite the second notch and the first notch is smaller than the second notch; the first notch and the second notch both connect the second front sound cavity to the first front sound cavity; the first notch is located on a side of the second frame close to the sound-conducting channel, and the second notch is located on a side of the second frame away from the sound-conducting channel.

2. The speaker device of claim 1, wherein the first notch and the second notch are both formed by a downward depression of one end of the second frame away from the magnetic circuit system; a depth of the first notch is less than a depth of the second notch, and a width of the first notch is less than a width of the second notch.

3. The speaker device of claim 1, wherein an end of the conductive insert away from the second diaphragm is arranged through the casing and at least partially exposed outside the casing.

4. The speaker device of claim 3, wherein the magnetic circuit system comprises an upper splint in the shape of an annulus, a lower splint, a main magnetic steel, a first sub-magnetic steel, a pole core, and a second sub-magnetic steel; wherein the upper splint is fixedly stacked on the first sub-magnetic steel and fixedly connected to the first frame; the main magnetic steel is in the shape of an annulus and fixedly stacked on the lower splint; the first sub-magnetic steel is fixedly stacked on the lower splint and arranged around the main magnetic steel, and the main magnetic steel and the first sub-magnetic steel are spaced apart to form the first magnetic gap;

the pole core comprises a core body in the shape of an annulus and fixedly fixed to the main magnetic steel and a core extension in the shape of an annulus and bent and extended from an inner periphery of the core body along a direction away from the lower splint, wherein the core extension is arranged around the conductive insert;

the second sub-magnetic steel is fixedly stacked on a side of the core body close to the first vibration system, the second sub-magnetic steel is arranged around the core extension and spaced apart from the core extension to form the second magnetic gap.

5. The speaker device of claim 4, wherein the magnetic circuit system further comprises a secondary pole core fixedly stacked on a side of the second sub-magnetic steel close to the first vibration system, wherein the secondary pole core is in the shape of an annulus and arranged around the conductive insert, and the second frame is connected to an outer periphery of the secondary pole core.

6. The speaker device of claim 4, wherein the first vibration system further comprises a first skeleton, comprising a skeleton body in the shape of an annulus and used as the first vibration portion and a skeleton fixing portion bent downwardly and extended from an outer periphery of the skeleton body.

7. The speaker device of claim 1, wherein the first diaphragm comprises a first folded ring in the shape of an annulus, a second folded ring in the shape of an annulus, which is spaced apart from the first folder ring and arranged on an inner side of the first folded ring, and a first vibration portion in the shape of an annulus, which is bent and extended from an inner periphery of the first folded ring to be connected to the outer periphery of the second folded ring; an outer periphery of the first folded ring is fixed to the first skeleton; an inner periphery of the second folded ring being fixed to the second skeleton body; an inner periphery of the second folded ring is fixed to a side of the first sub-magnetic steel away from the main magnetic steel; and the first voice coil is fixed to a side of the first vibration portion close to the magnetic circuit system.

8. The speaker device of claim 7, wherein the inner periphery of the second folded ring is fixedly sandwiched between the second frame and the main magnetic steel.

9. The speaker device of claim 1, wherein the second diaphragm comprises a second vibration portion, a third folded ring in the shape of an annulus and extended outwardly from an outer periphery of the second vibration portion, and a second dome covered on the second vibration portion, wherein an outer periphery of the third folded ring is fixed to a side of the second frame away from the first sub-magnetic steel, and the second voice coil is fixed to the second vibration portion.

* * * * *